(12) United States Patent
Luong

(10) Patent No.: US 11,987,403 B2
(45) Date of Patent: May 21, 2024

(54) METHOD FOR DESTROYING THE ENEMY'S TARGETS USING MISSILES LAUNCHED FROM MULTICOPTER DRONES CARRIED INSIDE SOLDIERS' BACKPACKS

(71) Applicant: Quoc Viet Luong, Castro Valley, CA (US)

(72) Inventor: Quoc Viet Luong, Castro Valley, CA (US)

( * ) Notice: Subject to any disclaimer, the term of this patent is extended or adjusted under 35 U.S.C. 154(b) by 0 days.

(21) Appl. No.: 17/813,042

(22) Filed: Jul. 17, 2022

(65) Prior Publication Data

US 2023/0249849 A1  Aug. 10, 2023

(51) Int. Cl.
| | |
|---|---|
| *B64U 80/60* | (2023.01) |
| *B64U 10/14* | (2023.01) |
| *B64U 20/50* | (2023.01) |
| *B64U 20/87* | (2023.01) |
| *B64U 60/40* | (2023.01) |
| *B64U 101/18* | (2023.01) |

(52) U.S. Cl.
CPC .............. *B64U 80/60* (2023.01); *B64U 10/14* (2023.01); *B64U 20/50* (2023.01); *B64U 20/87* (2023.01); *B64U 60/40* (2023.01); *B64U 2101/18* (2023.01); *B64U 2201/20* (2023.01)

(58) Field of Classification Search
CPC ........ B64U 10/14; B64U 20/50; B64U 20/87; B64U 80/60; B64U 80/70; B64U 60/40; B64U 2201/20
See application file for complete search history.

(56) References Cited

U.S. PATENT DOCUMENTS

| | | | |
|---|---|---|---|
| 7,185,575 B1* | 3/2007 | Collier | F41A 23/24 |
| | | | 89/1.8 |
| 9,062,948 B1* | 6/2015 | Calvert | F41H 3/00 |
| 10,112,700 B1* | 10/2018 | Birch | B64C 25/14 |
| 11,413,974 B2* | 8/2022 | Fisher | B64F 1/222 |
| 2016/0304217 A1* | 10/2016 | Fisher | B60L 53/51 |
| 2018/0093753 A1* | 4/2018 | Chow | B64C 11/28 |
| 2018/0244402 A1* | 8/2018 | Kahlon | B64F 1/04 |
| 2019/0077503 A1* | 3/2019 | Reddy | F42B 10/58 |
| 2019/0127066 A1* | 5/2019 | Tournet | B64C 1/34 |
| 2019/0367169 A1* | 12/2019 | O'Leary | F41A 27/08 |
| 2020/0017209 A1* | 1/2020 | Lacaze | B64D 7/00 |
| 2020/0051438 A1* | 2/2020 | Magdaleno | G05D 1/0027 |
| 2022/0001975 A1* | 1/2022 | Cracknell | B64C 27/08 |

FOREIGN PATENT DOCUMENTS

| | | | | |
|---|---|---|---|---|
| JP | 2020508615 A * | 3/2019 | | B64C 39/024 |
| JP | 6811336 B2 * | 1/2021 | | B64C 39/024 |
| WO | WO-2020087104 A1 * | 5/2020 | | A45F 3/04 |

* cited by examiner

*Primary Examiner* — Benjamin P Lee

(57) ABSTRACT

A method for destroying enemy's targets is disclosed which comprises the following steps: (a) carrying a multicopter drone in a backpack of a first soldier; (b) removing the multicopter drone from the backpack, unfolding, and coupling a missile to the multicopter drone; (c) remote controlling the multicopter drone to search for the enemy' targets using a remote control; and (d) launching the missile from the multicopter drone when the enemy' targets are detected.

20 Claims, 8 Drawing Sheets

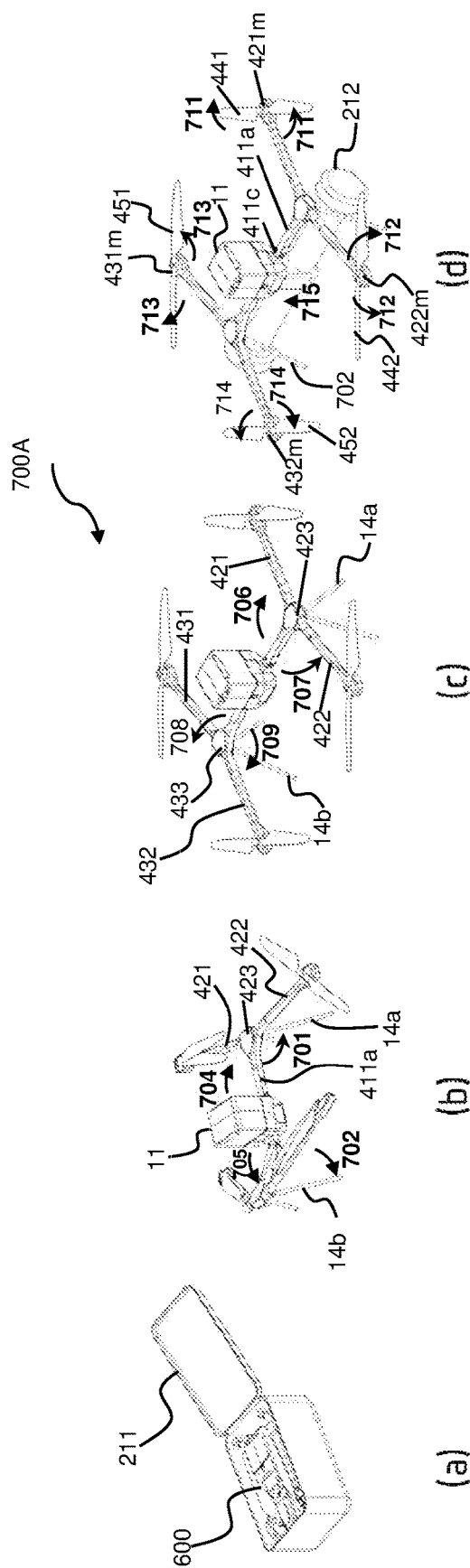
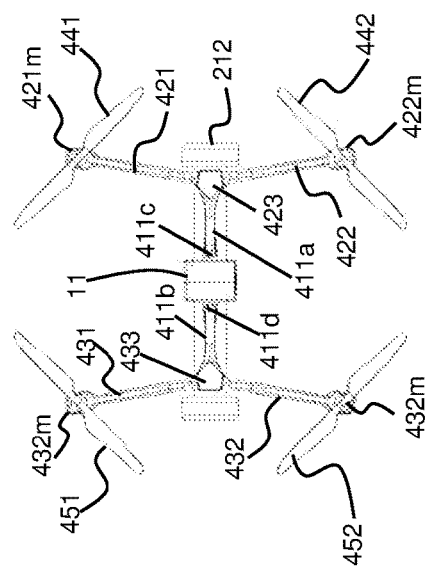
FIG. 7A
FIG. 7B

METHOD FOR DESTROYING THE ENEMY'S TARGETS USING MISSILES LAUNCHED FROM MULTICOPTER DRONES CARRIED INSIDE SOLDIERS' BACKPACKS

CLAIM OF PRIORITY

This application claims priority under 35 U.S.C. § 120(d) of the Paris Convention of the Application No. 2021250980, entitled "A Multicopter", filed on 15 Oct. 2021 in Australia. The parent application is incorporated herewith in its entirety for references.

FIELD OF THE INVENTION

The present invention relates generally to combat methods. More specifically, the present invention relates to a combat method using portable drones.

BACKGROUND ART

In today conventional battles, a group of soldiers must approach sufficiently close to the enemy's tanks and other targets such as enemy's troops, trucks, airports, bunkers, etc. Then these soldiers must use portable missile launchers such as the PLX-1 to destroy the enemy's tanks. At this close distance, these soldiers put themselves in harm ways because the enemy's tanks can also detect and preemptively eliminate these soldiers. Furthermore, ground level detection of enemy's tanks by soldiers on the ground have a limited angle of view. Consequently, these soldiers do not know how many tanks and how many troops are deployed in a particular battle front. If one tank is destroyed, the soldiers are exposed to the remaining enemy tanks, aircrafts, and/or troops. Thus, the conventional portable anti-tank missile launchers are not safe for the soldiers who operate them. As such, weaponry operated by soldiers often result in poor efficiency (i.e., low kill ratio). Furthermore, soldiers carrying anti-tank missile launchers and combat gears are slow and less agile in comparison to other combat machines such as drones, tanks, vehicles, and unmanned aerial vehicles (UAV) in today warfare. Thus, the use of soldiers in battles is risky, low kill ratio, and often resulting in high casualties.

To reduce casualties, large multicopter drones and UAVs such as the Predator, General Atomics MQ-1, or the likes have been used to destroy different enemy's targets such as tanks, bunkers, vehicles, ships, buildings, and military aircrafts parking in airports. However, these large UAV are unmanned aircrafts require either a long runway for take-off or landing or cumbersome catapult type launchers. These UAVs that requires long runways are heavy, expensive, and complex. In addition, longer flight time and higher lift capacity, in turn, by the law of physics require larger-sized multicopters because larger propellers, which are equivalent to larger wingspans of a fixed wing, generate more lift allowing a multicopter to carry a bigger battery and a heavier payload.

Large multicopters, however, have limited portability. They are more difficult and more costly to carry around. Poor portability in turn reduces the utilization of large multicopters in real world scenarios.

On the other hands, small multicopter drones catapulted by launchers such as Switchblades or Killer Drones are self-destructible. That is, these drones are the bombs themselves. Once the enemy's targets are identified, these Switchblade drones would fly directly into these targets just like the kamikaze suicide bombers during the World War II. However, these Switchblade drones cannot carry heavy weapons such as the air-to-ground anti-tank missiles, bombs that can destroy tanks. Additionally, they are self-destructible, and they cannot come back intact after a mission. The Switchblade drone costs at least 2 million USD a piece. Switchblades 300 costs around $6,000 USD and Switchblade 600 costs is in the range of a few dozen thousand USD.

In sum, the problems with today UAV and multicopter drones are that they are either too big or too small to replace soldiers in battlefields. They can neither (a) be carried by soldiers into battlefield, (b) transport heavy weapons, (c) fly out to search and destroy missions, and (d) return to the soldiers for future use. This is because today's multicopter drones cannot solve the folding problems from a fully extended state to a fully folded state and vice versa. Consequently, there are a large empty space in the folded state and thus the reduction ratio is low.

The best folding designs in the industry to date can generally shrink a multicopter's folded volume to around one fifth of its original unfolded volume. A 1:5 reduction ratio by far still falls short of practical demands. As an example, using the best designs currently available, a quadcopter with 28" propellers would have a folded volume 2.5 times as big as that of a carry-on which is still too big and too inconvenient for soldiers to carry in their backpacks.

For illustration, the dimensions and reduction ratios of some of the most popular multicopters on the market are presented in Table 1 below.

TABLE 1

Dimensions and reduction ratios of various prior-art pmulticopters

| Description | DJI M300 | DJI Mavic 2 | DJI Matrice 600 | Sony AirPeak |
|---|---|---|---|---|
| Unfolded Length (w/o props, mm) | 810 | 322 | 1133 | 592 |
| Unfolded Width (w/o props, mm) | 670 | 242 | 984 | 528 |
| Unfolded Height (w/o props, mm) | 430 | 84 | 759 | 513 |
| Folded Length (w/props, mm) | 430 | 214 | 640 | 592 |
| Folded Width (w/props, mm) | 420 | 91 | 582 | 528 |
| Folded Height (w/props, mm) | 430 | 84 | 623 | 513 |
| Own reduction ratio | 33% | 25% | 28% | 100% |

The equation for determining the Own reduction ratio is as follows.

$$\text{Own reduction ratio} = \frac{\text{Unfolded Length} * \text{Unfolded Width} * \text{Unfolded Height}}{\text{Folded Length} * \text{Folded Width} * \text{Folded Height}}$$

The industry has been waiting for a new design that can combine the benefits of:
  i) the longer flight time and payload capacity of larger-sized multicopters, and
  ii) the portability of compact drones.

However, there is an inherent technical challenge to reduce the reduction ratio to make multicopters more compact in the folded state. In the prior-art designs, the main body which serves mainly as the housing of avionics effectively remains unchanged regardless of the size of the multicopter. In contrast, the arm length of a multicopter has to grow proportionally with the size of the multicopter in order to provide sufficient clearance for bigger propellers. As a result, large multicopters have very long arms relative to the size of the main body. This creates a problem as to how to fold very long arms tightly around a small main body to minimize the folded volume. This is a significant challenge that has not been addressed.

In addition, multicopters also need to incorporate other components such as sensors, GPS antennas, RF antennas, a, compass, landing gear, and payloads. The presence of the propellers on the multicopter can lead to compromised placement of these components. For example, the propellers may inhibit the placement of cameras in certain locations on the spar of the multicopter and/or the camera's field of view is blocked by the rotors.

Therefore, what is needed is a new method for destroying enemy's targets without directly involving human soldiers.

What is needed is a method for destroying the enemy's targets without exposing and putting the soldiers in harm ways, thus reducing casualties, and increasing efficiency.

What is needed is a method for destroying the enemy's targets with high degree of maneuverability and wider range and aerial field of view.

What is needed is a new method for destroying enemy's targets using a multicopter drone designed and folded in a manner that a soldier can carry the multicopter drone by herself or himself.

What is needed are a design and arrangement of multicopter drone that, when fully extended, it has a dimension 90% larger than that when it is fully folded.

In addition, what is needed is method for destroying the enemy's targets using a missile launched from such multicopter drone.

What is needed is a method for destroying the enemy's targets that is cost-effective and capable of repeated uses, thus cutting costs.

The method of the present invention meets the above needs and solve the above problems.

SUMMARY OF THE INVENTION

Accordingly, an object of the present invention is to provide a method for destroying enemies' targets is disclosed which comprises the following steps: (a) carrying a folded multicopter drone in a backpack of a first soldier; (b) removing the folded multicopter drone from the backpack, unfolding, and coupling a missile (which is carried by different soldiers) to the multicopter drone; (c) remote controlling the multicopter to search for the enemies' targets using a remote control; (d) launching the missile from the multicopter drone when the enemies' targets are detected; and (e) returning the multicopter drone to safety after a mission.

Another object of the present invention is to provide a method for destroying an enemy's target using a missile or other weaponry launched from a multicopter drone.

Yet another object of the present invention is to provide a method for destroying the enemy's targets without exposing and putting the soldiers at risks.

Another object of the present invention is to provide a method for better detecting the enemy's position and targets, e.g., having a wider field of view, a larger detection range, and a more precise detection of the enemy's position.

Another object of the present invention is to provide a method for destroying an enemy's target that is efficient, cost-effective, and capable of returning the multicopter drone home safely for future use.

These and other advantages of the present invention will no doubt become obvious to those of ordinary skill in the art after having read the following detailed description of the preferred embodiments, which are illustrated in the various drawing and figures.

BRIEF DESCRIPTION OF THE DRAWINGS

The accompanying drawings, which are incorporated in and form a part of this specification, illustrate embodiments of the invention and, together with the description, explain the principles of the invention.

FIG. 7A includes diagrams illustrating the process of deploying a multicopter drone from a backpack of a soldier wherein the multicopter drone can carry a weaponry such as a missile in accordance with an embodiment of the present invention.

FIG. 7B is a diagram of a top-down view of a fully assembled multicopter drone ready for deployment in accordance with an embodiment of the present invention.

Figure 1:
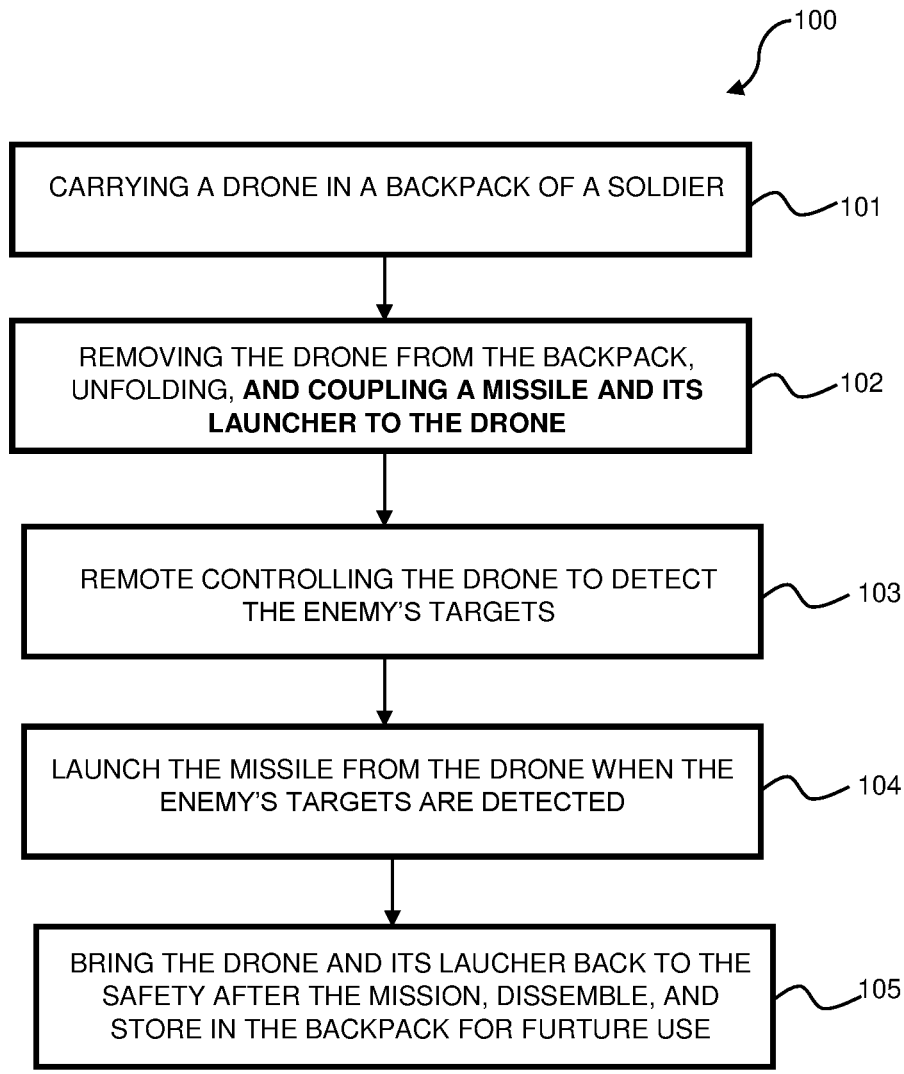
FIG. 1 is a flow chart of a method of destroying various enemy's targets using a missile launched from a multicopter drone carried in a backpack of a soldier in accordance with an exemplary embodiment of the present invention.

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Within the scope of the present description, the reference to "an embodiment" or "the embodiment" or "some embodiments" means that a particular feature, structure, or element described with reference to an embodiment is comprised in at least one embodiment of the described object. The sentences "in an embodiment" or "in the embodiment" or "in some embodiments" in the description do not therefore necessarily refer to the same embodiment or embodiments. The feature, structures or elements can be furthermore combined in any adequate way in one or more embodiments.

Within the scope of the present description, the word "drones" include different forms of unmanned flying targets including unmanned aerial vehicles, drones, multicopters with propellers affixed at different locations on the drones.

Within the scope of the present description, the words "coupling", "connecting", "coupled", "coupling", "connections", "coupler", "bolted", "laid", "connected" "positioned", "attached", "attaching", "affixed", "affixing" are used to mean attaching between two described members using hardware such as screws, nails, tongs, prongs, clips, spikes, staples, pins, male and female nuts, buttons, sleeves, lugs, pivots, cams, handles, bars, fasteners, connectors, ball-bearing latches, 3D gimbals, or the likes that meet the MIL-STD commercial off the shelf (COTS).

Within the scope of the present description, the word "remote control", "remote controlling" is used to mean wired and/or wireless controlling. Wired connections include electrically conducting wires, cables, lines, coaxial cables, strips, or the likes that meet the MIL-STD. Conducting wires are made of conductors such as coppers, aluminum, gold, or the likes that meet the MIL-STD. Wireless connections include electromagnetic waves and long-range wireless communication channels include UHF/VHF radio frequencies 900 MHz and 2.4 Ghz.

Within the scope of the present description, the word "rotation", "rotating", "rotate" includes clockwise and/or counterclockwise direction.

Within the scope of the present invention, the Cartesian XYZ coordinate (x,y,z) also includes equivalent spherical coordinate (r, Θ, ϕ), and/or cylindrical coordinate (r, Θ, z) that can determine the directions of movements or coordinates of the enemy's targets including GPS coordinates.

Within the scope of the present description, the word motors refer to the rotors that drive the propellers, tilt rotors, electric rotors, hybrid rotors, AC brushless motors (BLAC), DC brushless motors (BLDC), also known as permanent magnet synchronous motors (PMSM).

Within the scope of the present description, the word targets refer to the enemy's tanks, armored vehicles, military transportation means, trucks, ships, troops, bunkers, buildings, tents, airports, and aircrafts on the ground, the enemy's ground missile launchers, or the likes.

Referring now to the drawings and specifically to FIG. 1, a flow chart of a method 100 for destroying enemy's targets using a multicopter drone capable of being carried by a soldier in a backpack and deployed therefrom in accordance with an exemplary embodiment of the present invention is illustrated. Method 100 provides a novel method for both detecting and destroying the enemy's targets using a multicopter drone carried by a single soldier. That is, the multicopter drone is invented such that the volume reduction ratio between a folded (stowed) state and fully extended (operational) state is significantly large (in the range of more than 90%) so that a soldier can carry it in his/her backpack. In the operational state, the multicopter drone is extended out to carry heavy weaponry in accordance with the law of physics.

More particularly, at step 101, a multicopter drone is carried inside a backpack of a soldier. To implement step 101, the multicopter drone must be sufficiently light and compact to be inserted inside the soldier's backpack. Yet the multicopter drone has great lift capacity to carry heavy weaponry when fully extended. In various embodiments of the present invention, step 101 is realized by a multicopter drone having a dimension of 200 cm×200 cm×50 cm and weighs 56 kg (including a missile weighing 33 kg) in operational state. In the folded state, the multicopter drone has a dimension 60 cm×38 cm×25 cm and weighs 23 kg. Thus, the volume reduction ratio is 97%. This multicopter drone can lift a missile that weighs up to 33 kg. With this reduction ratio, this multicopter drone is capable of being carried by a single soldier who may advance toward the enemy targets in adversary environment such as deserts, mountains, swamps, and dense jungles.

At step 102, the multicopter drone is removed from the backpack and unfolded. In many aspects of the present invention, second soldiers carry the missile and its launcher, both to be deployed by the multicopter drone. Once the multicopter drone is fully extended, the missile and its launcher can be coupled to the multicopter drone using different types of couplers known in the art such as gimbal connectors or other types of well-known connectors. In many preferred embodiments, the missile and its launcher are coupled to the multicopter drone at the center of gravity of the missile and its launcher. Please refer to FIG. 7A(a)-FIG. 7A(d) below. As alluded above, the multicopter drone when fully extended has a wingspan of 2.2 meters.

At step 103, the multicopter drone carrying the missile and its launcher is remotely controlled to fly out to detect the enemy's targets. In many aspects of the present invention, the flying range of the multicopter drone is 6 km sufficient to stay out of the enemy's detection range. In many aspects of the present invention, the multicopter drone is equipped with cameras operable to transmit a wide angle of view of the enemies and their positions.

At step 104, the missile is launched from the multicopter drone via a remote control when the enemy's targets are detected. The detection of the enemy's targets is achieved by either visual or thermal images transmitted from the multicopter drone back to the operating soldier. In other aspects, GPS coordinates are also transmitted back to the operating soldier. When the soldier decides to destroy the enemy's targets, he or she presses a button on the remote control, the missile is launched from the launcher. The missile is automatically heading toward the enemy's targets because the missile can be an automatically self-guided missile such as the Javelin. In different aspects of the present invention, step 104 can be implemented with air-to-ground missiles, ground-to-ground missiles, surface to air such as the FIM-92 Stinger, shoulder operated air-to-air missiles, various types of bombs such as laser guided bombs, and automatic Gatling guns such as the M134. In other words, the multicopter drone of the present invention is used as an effective heavy weapon system. All of this is possible because of the large wingspan in the operational state that allows the multicopter drone of the present invention to carry heavy weaponry. On the other hands, in the folded state, the multicopter drone of the present invention is compact the light that it can be carried in the backpack of a soldier.

Finally, at step 105, after destroying the enemy's target such as—but not limited to—a tank, the multicopter drone is returned safely to the operating soldier far away from the enemy's position. The multicopter drone is then disconnected from the launcher, folded up, and stored in the backpack, ready for the next mission. As alluded above, the multicopter drone when folded has a dimension of 60 cm×38 cm×25 cm, small and compact enough to be stowed in the soldier's backpack.

It will be noted that in some aspects of the present invention, other weapons can be carried by the multicopter drone such as—but not limited to—bombs, machine guns, air to ground missiles, etc.

Figure 2:
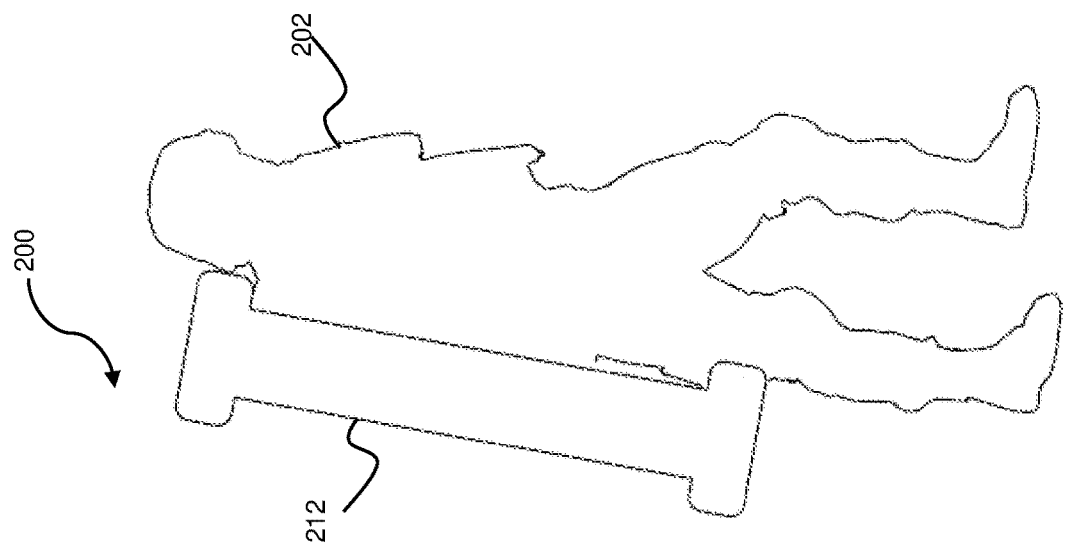
FIG. 2 is diagram illustrating the portability of the multicopter drone in a folded state used in the method of the present invention.
Figure 2:
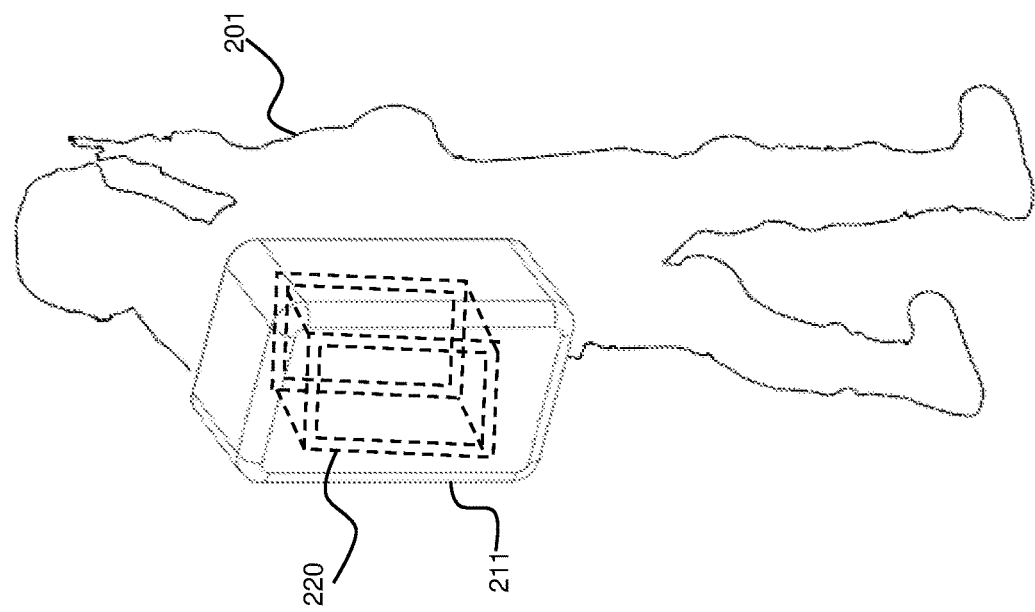

Now, referring to FIG. 2, a perspective diagram 200 demonstrating the portability of the multicopter drone in accordance with an exemplary embodiment of the present invention is illustrated. A first soldier 201 carries a multicopter drone 600 neatly folded in his or her backpack 211. The dimension of the multicopter drone when stowed by first soldier 201 is 60 cm×38 cm×25 cm One or more second soldiers 202 is designated to carry at least one missile stored in their launchers 212. In many embodiments of the present invention, the missiles are the FGM-148 Javelin missile which weighs 22.3 kg. However, other types of aerial deployment missiles with heavier weights can be used. Furthermore, other weaponry or devices can be carried in the same fashion as described in method 100 above. In other situations, a third soldier (not shown) can be designed to carry auxiliary equipment to support the operations and maintenance multicopter drone 600. The auxiliary equipment includes batteries, replacement propellers, couplers, cables, parts, couplers, IC boards, command launch unit (CLU), etc.

Figure 3:
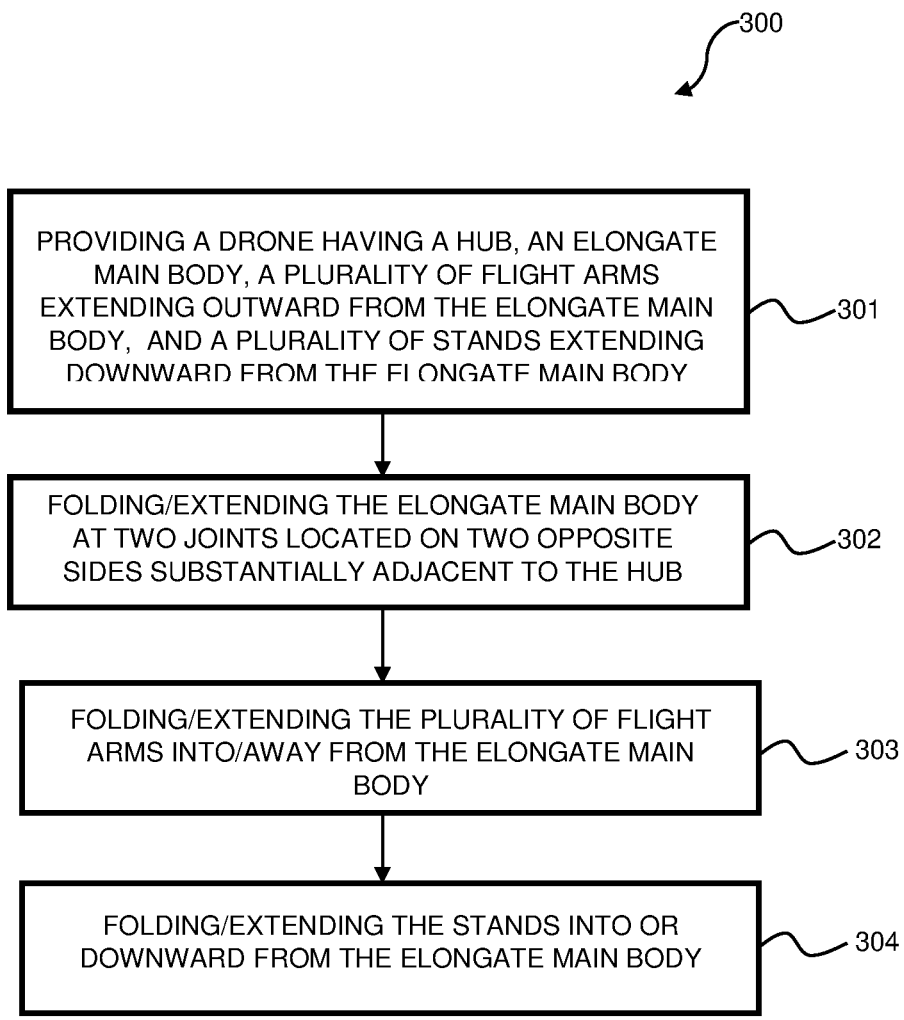
FIG. 3 is a flow chart of a method of designing a multicopter drone that is used to implement the method of FIG. 1 in accordance with an aspect of the present invention.

Next, referring to FIG. 3, a flow chart of a method 300 that enables the reduction ratio of 97% from its extended (operational) state to its folded (stowed) state so that method 100 can be implemented in accordance with an aspect of the present invention is illustrated.

At step 301, a multicopter drone having a hub, an elongate main body that supports the hub, a plurality of flight arms extending outward from the elongate main body, and a plurality of stands extending downward from the elongate main body is provided. Please refer to FIG. 4 for the complete illustration of the described multicopter drone. More particularly, an elongate main body 410 supports a hub 11. In various embodiments of the present invention, hub 11 can be removably connected to elongate main body 410 at any angle on the plane of the Z-axis of a Cartesian coordinate 499. That is, hub 11 can be rotatably connected to elongate main body 410 at any angle relative to the Z-axis depending on the type of payloads and the mission objective.

Hub 11 divides elongate main body 410 into a first segment 411a and a second segment 411b. First segment 411a is connected to a first main body folding joint 411c positioned near a bottom side of hub 11. Second segment 411b is connected to a second main body folding joint 411d positioned near a bottom side and in opposite of first main body folding joint 411c. With this arrangement, first segment 411a is folded adjacent to hub 11 by first main body folding joint 411c, leaving no empty spaces therebetween. Second segment 411b is folded adjacent to hub 11 by second main body folding joint 411d, leaving no empty spaces therebetween.

Figure 4:
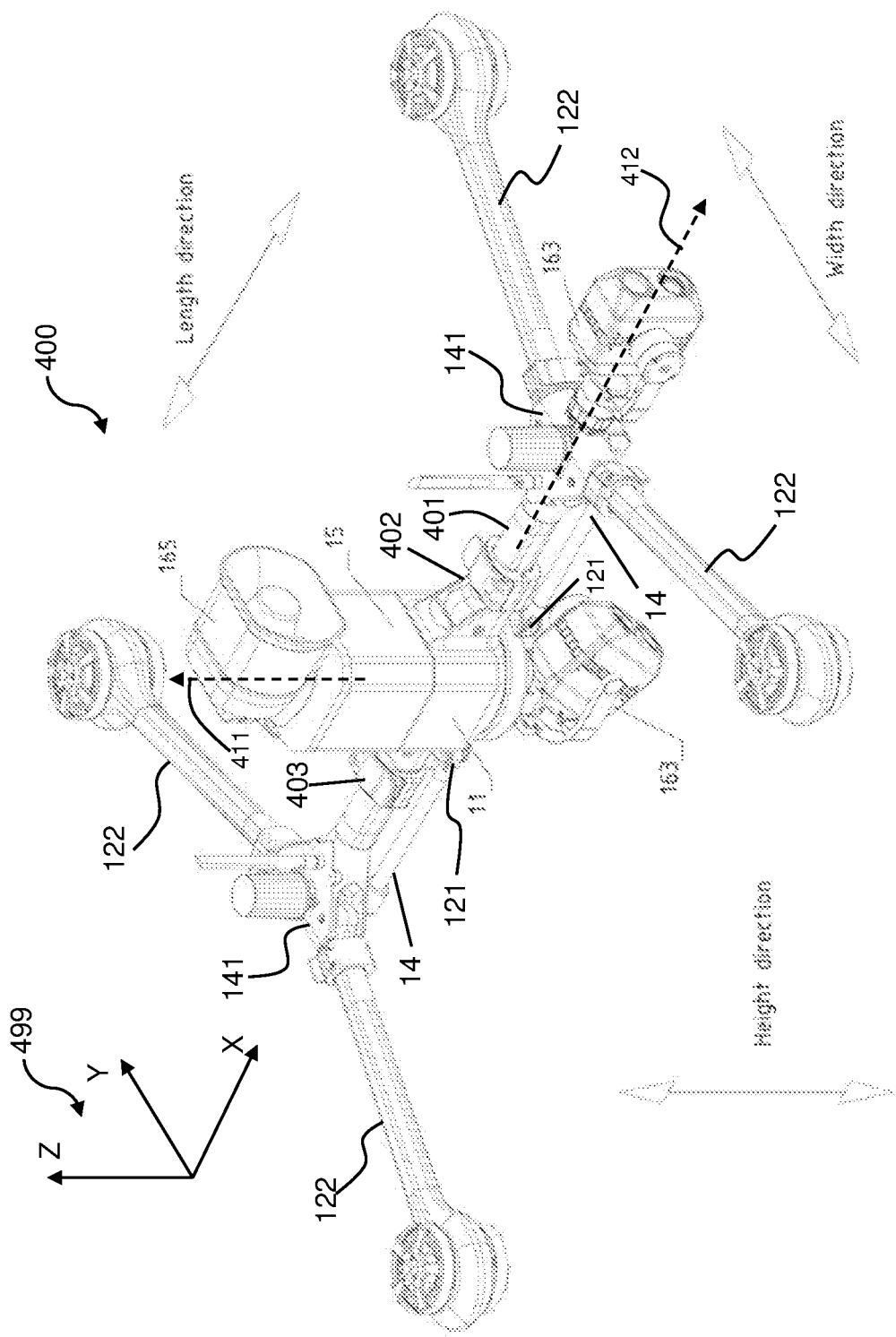
FIG. 4 is a perspective diagram of a multicopter drone designed by the method of FIG. 3 in a fully extended state in accordance with an exemplary embodiment of the present invention.

Continuing with step 301 and FIG. 4, a first flight arm 420 is connected to first segment 411a at a first flight arm folding joint 423. A second flight arm 430 is connected to second segment 411b at a second flight arm folding joint 433. First flight arm 420 comprised a first cross arm 421 and a second cross arm 422 which are configured to be folded into first segment 411a, leaving no empty spaces therebetween. Second flight arm 430 comprised a third cross arm 431 and a fourth cross arm 432 which are configured to be folded into second segment 411b, leaving no empty spaces therebetween. First cross arm 421 is connected to a first motor 421m, and second cross arm 422 is connected to a second motor 422m. Third cross arm 431 is connected to a third motor 431m, and fourth cross arm 432 is connected to a fourth motor 432m. First motor 421m to fourth motor 431m are either fixed pitch or variable pitch rotors.

At step 302, the elongate main body is folded or extended at two main body folding joints located on two opposite sides that are substantially adjacent to the hub. In other words, the two main body folding joints are located substantially in flush with the opposite sides of the hub in the Z direction so that the elongate main body does not yield any wasteful empty spaces between the hub and itself. FIG. 4 illustrates an implementation of step 302. First and second main body folding joints 411c and 411d are located almost in flush with the two opposite sides of a hub 11 in the Z direction of a Cartesian coordinate system 499. In the folded (stowed) state, a first segment 411a and a second segment 411b of an elongate main body 410 almost touch and parallel to the respective opposite lateral sides of hub 11 along an axis 441z, leaving zero or very little empty spaces therebetween. In various embodiments of the present invention, axis 411z of hub 11 can be parallel to or formed an angle with the Z-axis.

At step 303, flight arms that supports the propellers are folded into the elongate main body. Referring again to FIG. 4, because of a first flight arm folding joint 423 and a second flight arm folding joint 433 located at the distal ends of elongate main body 410, flight arms 420 and 430 are folded to become a unitary unit with elongate main body 410, leaving zero or very little empty spaces therebetween.

Next at step 304, a plurality of landing gears is folded upward into the elongate main body. Referring to FIG. 4, in a four coaxial propeller embodiment 400, landing gear 14 is located at the distal ends of elongate main body 410. More specifically, landing gear 14 is comprised a first landing gear 14a and a second landing gear 14b. First landing gear 14a and second landing gear 14b are either V-shaped or inverted T-shaped. First landing gear 14a is folded into and parallel to first segment 411a of elongate main body 410. Second landing gear 14b is folded into and parallel to second segment 411b of elongate main body 410. In various embodiments of the present invention, landing gears 14a and 14b are located at first flight arm folding joint 423 and second flight arm folding joint 433 respectively. In some embodiments of the present invention, landing gears 14a and 14b are located at first main body folding joint 411c and second main body folding joint 411d respectively It is noted that multicopter drone 400 designed using method 300 is not limited to 4 propellers (or two flight arms 420 and 430), a plurality of flight arms 122 and a plurality of landing gears are also within the scope of the present invention. For example, method 100 and method 300 are applicable to four non-coaxial propeller (four flight arms), twelve coaxial propeller (or six flight arms), and sixteen coaxial propeller (or eight flight arms) multicopter drones.

Because of method 300 of the present invention implemented by multicopter drone 400 described above, a multicopter drone having a dimension of 200 cm×200 cm×50 cm and weighs 56 kg (including a missile weighing 33 kg) in operational state can be reduced to a dimension of 60 cm×38 cm×25 cm and weighs 23 kg. Thus, the reduction ratio is 97%. This multicopter drone can lift a missile that weighs up to 33 kg in the operational state of 2.2 meters wingspan. With this reduction ratio, this multicopter drone is capable of being carried by a single soldier who may move toward the enemy in adversary environment such as deserts, mountains, swamps, and dense jungles.

Next, referring to FIG. 4, four coaxial propeller multicopter drone 400 in a fully extended (operational) state that employs the method 300 of the present invention is illustrated. In some exemplary embodiments of the present invention, four propeller multicopter drone 400 includes an elongate main body 410 configured to support a hub 11 located at the center of elongate main body 410. Hub 11 divides elongate main body 410 into first segment 411a and second segment 411b. Four coaxial propeller multicopter drone 400 is an implementation of step 301. As seen in FIG. 4, elongate main body 410 is extended and folded perpendicular to a longitudinal axis 441x parallel with X-axis of a Cartesian coordinate system 499. This folding/extending operation is realized by first and second main body folding joints 411c and 411d located sufficiently adjacent to and in flush with lateral surfaces of hub 11. In many preferred embodiments of the present invention, hub 11 is a polyhedron with many lateral sides (surfaces). Hub 11 is supported by elongate main body 410 so that its main axis 441z is parallel to the Z axis of Cartesian coordinate system 499. With this novel arrangement, elongate main body 410 is folded toward the Z-axis or main axis 441z to hug closely along opposite surfaces of hub 11, yielding no wasteful empty spaces. Hub 11 is electrically connected to video cameras 163 and other sensors 165. Video cameras 163 may be RGB, thermal, infrared cameras. Sensors 165 include GPS, position magnetic sensors, optics, LIDAR. This disclosure is the implementation of step 302. First and second main body folding joints 411c and 411d may be 90° self-locking hinges.

Next, landing gear 14, comprised of first landing gear 14a and second landing gear 14b, are located either at first and second flight arm folding joints 423 and 433 respectively. First and second landing gears 14a and 14b are folded upward long the Z-axis into elongate main body 410. This is an implementation of step 304. First and second flight arms 420 and 430 are also folded into elongate main body 410 along the X-axis. First and second flight arms 420 and 430 are extended along the Y-axis. This is an implementation of step 303.

The full description of multicopter drone 400 is disclosed in a co-pending patent No. 2021250980, entitled "A Multicopter", filed on 15 Oct. 2021 in Australia. This patent application is incorporated in its entirety herewith.

Figure 5:
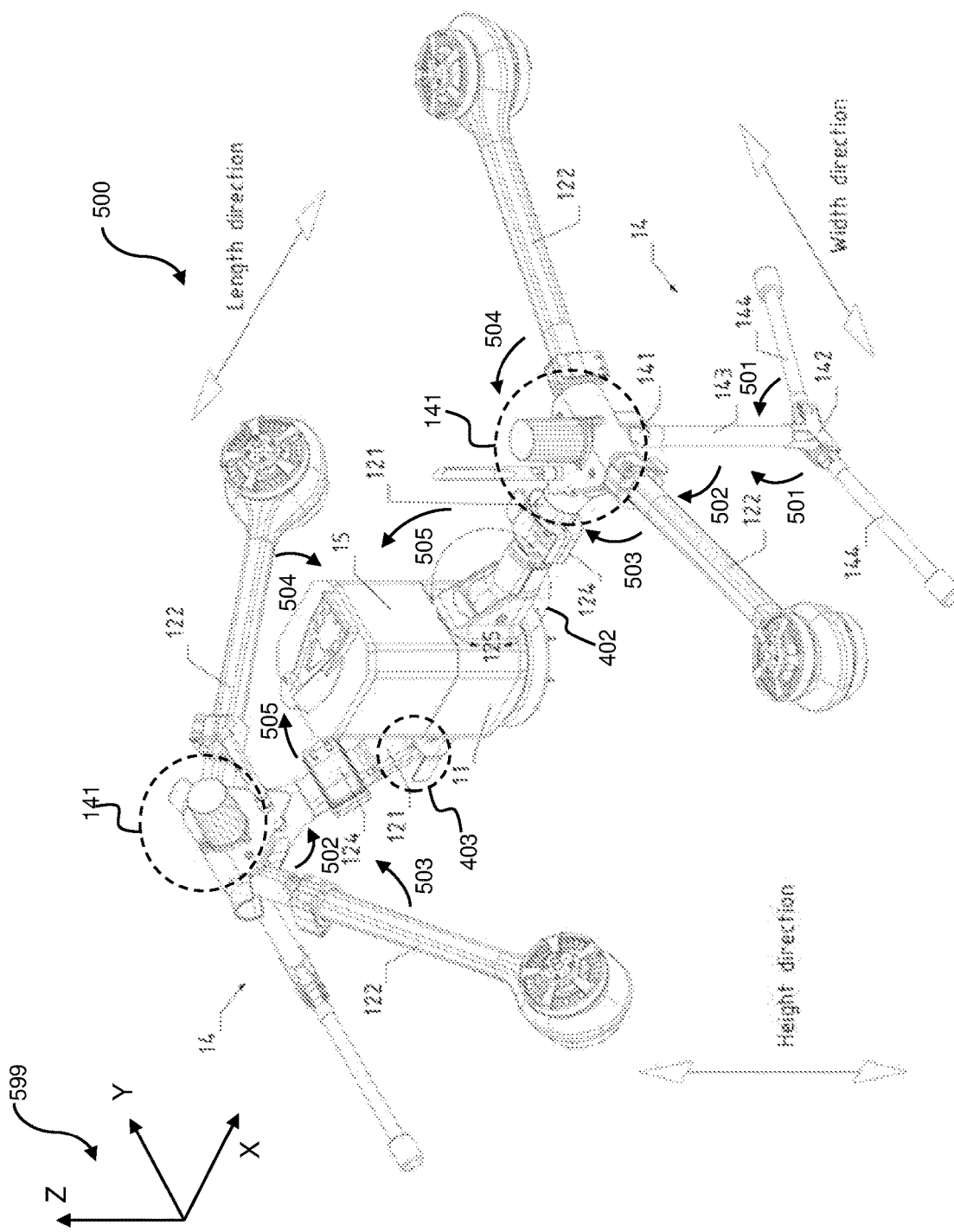
FIG. 5 is a perspective diagram showing locations of the geometrical structure and placements of the folding joints and landing gears of a multicopter drone designed by the method of FIG. 3.

Next referring to FIG. 5, a perspective diagram 500 further illustrating the folding joint locations and the folding process of multicopter drone of the present invention is illustrated. First main body folding joint 411c and second main body folding joint 411d are located at the opposite bottom surfaces of hub 11. First and second flight arms 420 and 430 are located at respective distal ends of elongate main body 410 at first flight arm folding joints 423 and second flight arm folding joint 433, extending outward along the Y-axis of a Cartesian coordinate system 499. Landing gears 14 are also located at first flight arm folding joints 423 and second flight arm folding joint 433. Hub 11 is supported by elongate main body 410 and stands in the Z-direction. In other embodiments of the present invention, hub 11 can be removably coupled to elongate main body 410 at any angles formed between axis 441z of hub and longitudinal axis 441x of elongate main body 410 in the Z-plane. First flight arm folding joints 423 and second flight arm folding joint 433 may be duplex 90° self-locking folding hinges.

From the fully extended (operational) state as shown in FIG. 4, first landing gear 14a is folded merging into first segment 411a as shown in a direction arrow 501. This operation is achieved by first landing gear folding joint 14c. Second landing gear 14b is folded merging into second segment 411b as shown in a direction arrow 501. This operation is achieved by second landing gear folding joint 14d.

Next, first cross arm 421 is folded merging into first segment 411a of elongate main body 410 along arrows 503 by the virtue of first flight arm folding joint 423. Second cross arm 422 is folded merging into first segment 411a of elongate main body 410 along arrows 503 by the virtue of first flight arm folding joint 423. First cross arm 431 is folded merging into second segment 411b of elongate main body 410 along arrows 504 by the virtue of second flight arm folding joint 433. Fourth cross arm 432 is folded merging into second segment 411b of elongate main body 410 along arrows 504 by the virtue of second flight arm folding joint 433.

Finally, first segment 411a is folded in the Z-direction merging into hub 11 along direction 505 by virtue of first main body folding joint 411c. Second segment 411b is folded in the Z-direction merging into hub 11 along direction 506 by virtue of second main body folding joint 411d. The completion of the above steps leads to the folded or stowed state in FIG. 6 below.

Figure 6:
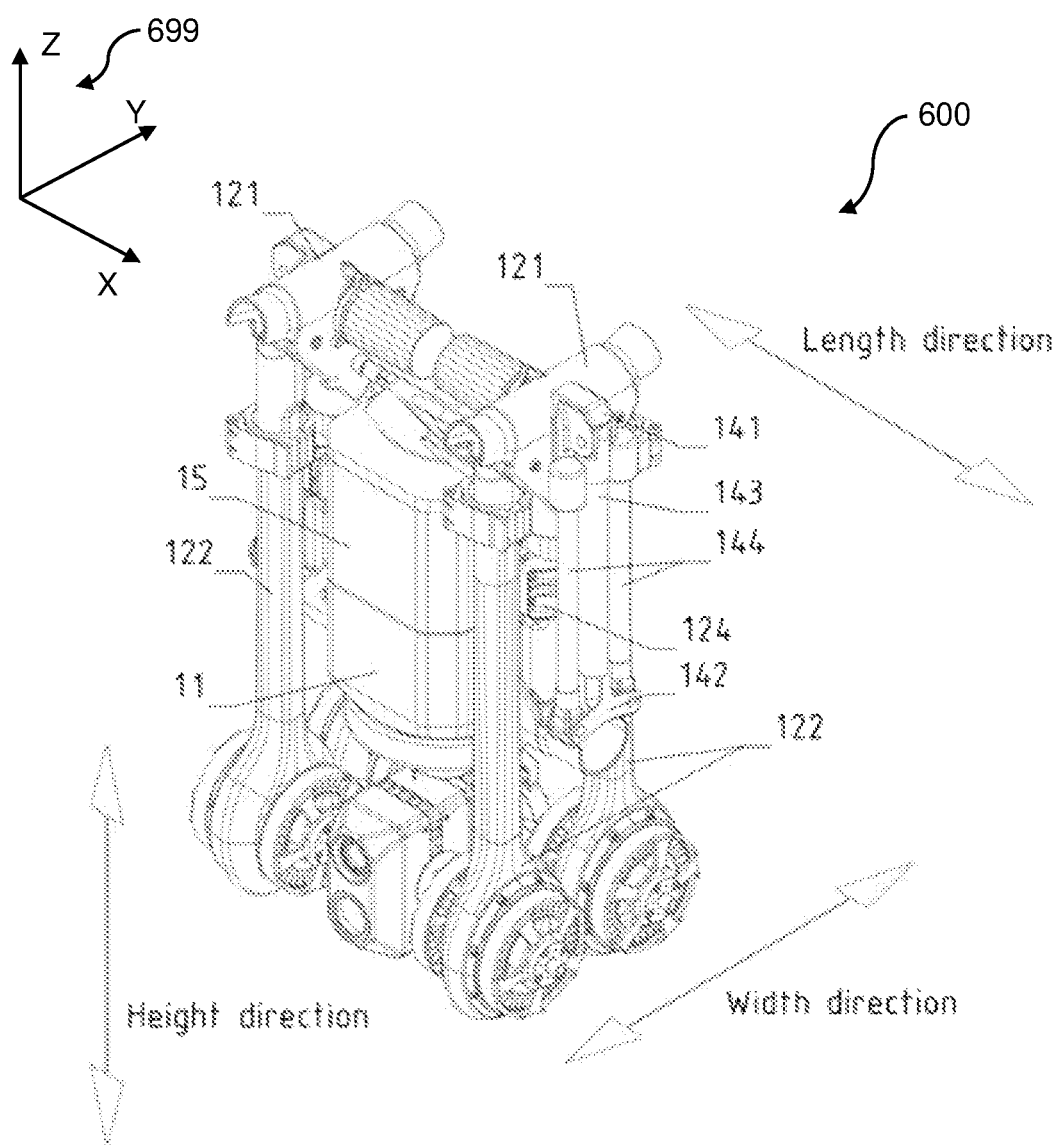
FIG. 6 is a perspective diagram of the multicopter drone designed by the method of FIG. 3 in a folded (stowed) state showing minimal waste space that results in a significant volumetric reduction between an operational state and a stowed state in accordance with an aspect of the present invention.

Next, referring to FIG. 6, a perspective diagram of multicopter drone 600 in the folded (stowed) after the folding process 300 and that in FIG. 5 is illustrated. As shown, in the fully folded state, multicopter drone 600 has almost zero waste empty spaces between the elements described above, i.e., hub 11, elongate main body 411, and first and second flight arms 420 and 430. Again, the reduction ratio between the fully extended state 400 in FIG. 4 and the fully folded state 600 in FIG. 6 is 97%. This allows method 100 to be realized. The dimension of multicopter drone 600 in the folded (stowed) status is 60 cm×38 cm×25 cm. This is sufficiently compact to be stowed in backpack 211. In the fully extended state of multicopter drone 400 as shown in FIG. 4, the dimension of multicopter drone 400 is 200 cm×200 cm×50 cm. That is the wingspan of multicopter drone 400 is 2.2 meters. With the following technical specifications:

Reduction ratio: 97%
Propeller size: 36"×19"
The width and length of the hub is 6"×6"
Folded status dimension: 60 cm×38 cm×25 cm
Fully extended (operational) status: 200 m×200 m×50 cm
Battery: 58.8V, 45000 mA
Maximum Take-off Weight (including a missile weighed 33 kg): 56 kgs
Maximum flight time without payload: 50 minutes With the wingspan of more than 2 m, multicopter drone 400 can carry weaponry such as the anti-tank missile Javelin, other high explosive anti-tank (HEAT) missiles, air to surface missiles, bombs, and artillery, etc. With the reduction of 97%, multicopter drone 600 is carried inside a soldier's backpack 211. With these features, multicopter drone 400 of the present invention is an effective weapon system.

Now referring to FIG. 7A, a series of diagrams 700A illustrating the assembling of multicopter drone 600 in accordance with an exemplary embodiment of the present invention are shown.

In FIG. 7A(a), a fully folded multicopter drone 600 as shown in FIG. 6 is neatly stored in backpack 211 of a soldier. Additional blades and parts of multicopter drone 600 are also stored inside backpack 211. Upon reaching the predetermined destination, first soldier 201 starts to open his/her backpack 211 and extend multicopter drone 600. Please also refer to FIG. 6 above.

Next, in FIG. 7A(b), multicopter drone 700 is unfolded by first flipping down first land gear 14a from first segment 411a in a direction 701. Next, second landing gear 14b is unfolded from second segment 411b in a direction 702. Following, first segment 411a is flipped down from hub 11 in a direction 704. Similarly, on the other side of hub 11, second segment 411b is flipped down from hub 11 in a direction 705.

Next, in FIG. 7A(c), first cross arm 421 is extended from first segment 411a in a direction 706. Then second cross arm 422 is extended from first segment 411a in a direction 707. Next, third cross arm 431 is extended from second segment 411b in a direction 708. Following, fourth cross arm 432 is extended from second segment 411b in a direction 709.

Finally, in FIG. 7A(d), a first coaxial propeller 441 connected to first motor 421m is extended in a direction 711. A second coaxial propeller 442 connected to second motor 422m is extended in a direction 712. A third coaxial propeller 451 connected to third motor 431m is extended in a direction 713. A fourth coaxial propeller 452 connected to fourth motor 432m is extended in a direction 714. Second soldier 202 couples missile and its launcher 212 to multicopter drone 710 at a coupler 16 in a direction 715. In many aspects of the present invention, coupler 16 is activated to release missile 212 by command launch unit (CLU) operated by first soldier 201. This control/release mechanism of coupler 16 is well-known in the art and needs not to be described in detail here. Missile 212 armed to multicopter drone 700 is a fire and forget missile.

Hub 11 is firmly mounted on top of elongate main body 410. Hub 11 contains integrated circuit (IC) boards (not shown) for remotely controlling multicopter drone 700, transmitter/receiver board, GPS, etc. The IC boards are well-known in the art and need not to be described herein. A battery 15 is coupled to provide the necessary power supplies to hub 11. Coupler 16 can be gimbaled connectors or other types of connectors. Electric motors 321m to 332m are mounted at the tips of first cross arm 421 to fourth arm 432 respectively. Each electric motor or servo 431m to 432m has a maximum thrust of 29 kg. Electric motors 421m to 432m with more thrust can also be used. Together four of them can carry a weapon of at least 33 kg while the weight of a Javelin including its launcher is 22.3 kg.

FIG. 7B shows a top view diagram 700B of multicopter drone 700 after being fully extended and assembled and ready to be deployed. Top view diagram 700B shows folding joints 411c, 411d, 423, and 433 aligned on elongate main body 410. Elongate main body 410 includes first main body folding joint 411c and second main body folding joint 411d for unfolding elongate main body 410. The locations of first main body folding joint 411c and second main body folding joint 711db are in flush with opposite sides of hub 11 as described above in FIG. 4 to FIG. 6. First flight arm folding joint 423 and a fourth flight arm folding joint 433 are designed for unfolding first cross arm 421 to fourth arm 433 respectively. In some embodiments of the present invention, elongate main body 410 may be telescopic tube so that the length of elongate main body 410 can be adjusted according to the type of missile 212

From the disclosure of FIG. 1 to FIG. 7A and FIG. 7B above, the following targets of the present invention are achieved:

(a) a method for destroying an enemy's target using a missile launched from a multicopter drone.

(b) a method for destroying the enemy's targets without exposing the soldiers to the enemy.

(c) a method for better detecting the enemy's position and targets, e.g., having a better angle of view.

(d) a method for destroying an enemy's target that is efficient, cost-effective, and capable of returning the multicopter drones to safety. These objectives are illustrated in FIG. 8 below.

Figure 8:
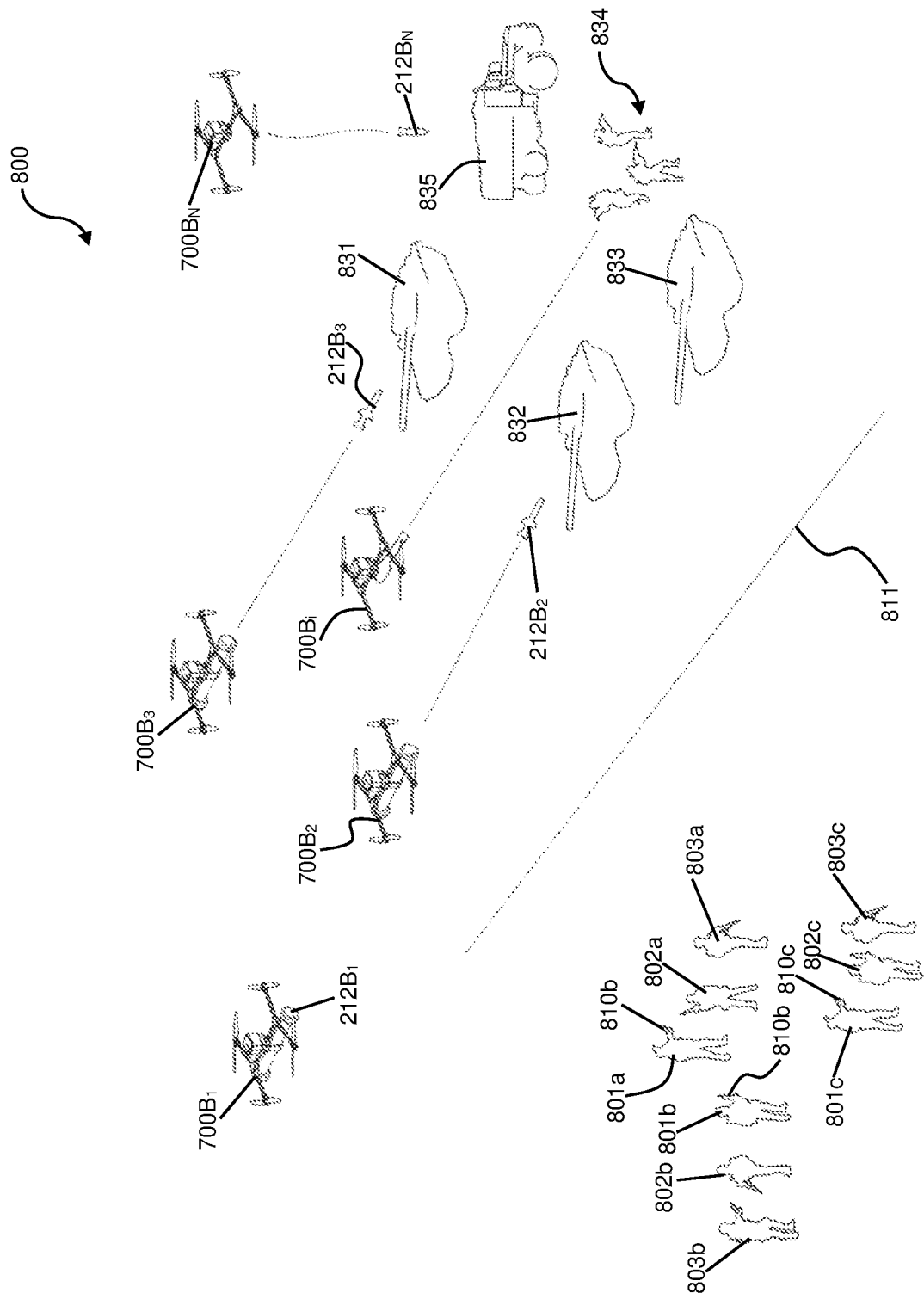
FIG. 8 illustrates a battlefield scenario wherein the soldiers destroy the enemy's tanks and other military targets using the method of the present invention.

Now referring to FIG. 8, a diagram 800 illustrating a deployment of a multitude of multicopter drones $700B_1$, $700B_2$, $700B_3$, to $700B_N$ in accordance with method 100 of the present invention is illustrated. A group of soldiers 801a, 802a, 803a to 801b, 802b, to 803b, to 801N, 802N, to 403N who control and support the operations to the multitudes of multicopter drones $700B_1$, $700B_2$, $700B_3$, to $700B_N$ using separate remote controllers 810a, 810b, and 810N respectively. An end of line of sight 811 separates the enemies from group of soldiers 801a, 802a, 803a to 801b, 802b, to 803b, to 801N, 802N, to 803N. It is noted that beyond line of sight 811 to the left of FIG. 8, the enemies cannot see the group of soldiers 801a, 802a, 803a to 801b, 802b, to 803b, and 801N, 802N, to 803N. On the other side of line 811, there are a first enemy tank 831, a second enemy tank 832, a third enemy tank 833, a caravan of military trucks 835, and ground troops 834.

Continuing with FIG. 8, as shown, first multicopter drone $700B_1$ carrying an anti-tank missile $212B_1$ as described in FIG. 7A to FIG. 7B and method 100 is still not launch its missile $212B_1$. Second multicopter drone $700B_2$ is launching its missile $212B_2$ toward enemy tank 832. In the meantime, third multicopter drone $700B_3$ is launching its missile $212B_3$ toward first enemy tank 831. On the other hand, multicopter drone $700B_N$ drops its bomb 212 to destroy caravan of military trucks carrying ammunition.

As illustrated in FIG. 8, FIG. 1 to FIG. 7A and FIG. 7B are applicable to situations where multiple multicopter drones as described above can be deployed at the same time. Furthermore, multicopter drone $700B_N$ can carry different weapons such as bombs from missiles 212. Thus, the number of multicopter drones, their types of weapons, their geometrical shapes, and their operations if read on method 100 and assembling steps in FIG. 7A to FIG. 7B are all within the scope of the present invention.

Because of the present invention, a team of multicopter drones $700B_1$ to $700B_N$ as described above in FIG. 1 to FIG. 7A, FIG. 7B can be deployed into an attacking force that is fast, evasive, agile, and effective.

The foregoing description details certain embodiments of the invention. It will be appreciated, however, that no matter how detailed the foregoing appears in text, the invention can be practiced in many ways. As is also stated above, it should be noted that the use of terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

After the foregoing description of the novel features and the details of certain embodiments of the invention above, it will be appreciated that the mechanical parts, the propeller driving motors, and electrical parts, sensors, controller boards, radars, transceivers, and the process to assemble them together to build multicopter drones 400, 600, and 700, a person of ordinary skills in the related arts can build the multicopter drones of the present invention without undue experiment. Therefore, they need not to be described in detail herein.

After the foregoing description details certain embodiments of the invention above, it will be appreciated that remote controlling and the operations of multicopter drones 400, and 700, a person of ordinary skills in the related arts and trained how to operate multicopter drones or the likes would know how to fly the multicopter drones of the present invention. Therefore, the controls and operations of the multicopter drones of the present invention need not to be described in detail herein.

Within the scope of the present description, the reference to "an embodiment" or "the embodiment" or "some embodiments" means that a particular feature, structure or element described with reference to an embodiment is comprised in at least one embodiment of the described object. The sentences "in an embodiment" or "in the embodiment" or "in some embodiments" in the description do not therefore necessarily refer to the same embodiment or embodiments. The particular feature, structures or elements can be furthermore combined in any adequate way in one or more embodiments.

DESCRIPTION OF NUMERALS

11 hub
14 landing gears
14a first landing gear
14b second landing gear
14c first landing gear folding joint
14d second landing gear folding joint
15 battery
16 coupler
163 video cameras
165 sensors
201 a first soldier who carries the drone in his/her backpack
202 a second soldier who carries the missiles
203 a third soldier who carries auxiliary devices
211 backpack containing the folded multicopter drone
212 missile carried by the multicopter drone
212B$_1$ missile carried by first multicopter drone
212B$_2$ missile carried by second multicopter drone
212B$_3$ missile carried by third multicopter drone
212B$_N$ air to ground bomb
400 multicopter drone in the fully extended state
410 elongate main body
411a first segment of elongate main body
411b second segment of elongate main body
411c first main body folding joint
411d second main body folding joint
420 first flight arm
421 first cross arm
421m first motor
422 second cross arm
422m second motor
423 first flight arm folding joint
430 second flight arm
431 third cross arm
431m third motor
432 fourth cross arm
432m fourth motor
423 second flight arm folding joint
441 first propeller
442 second propeller
451 third propeller
452 fourth propeller
499 Cartesian coordinate system
600 multicopter drone in folded state
700 armed multicopter drone in operational state
700B$_1$ first multicopter drone controlled by the first group
700B$_2$ second multicopter drone controlled by the second group
700B$_3$ third multicopter drone controlled by the third group
700B$_N$ N$^{th}$ multicopter drone controlled by the N$^{th}$ group
801a multicopter drone carrying soldier in the first group
802a missile carrying soldier in the first group
803a auxiliary devices carrying soldier in the second group
801b multicopter drone carrying soldier in the second group
802b missile carrying soldier in the second group
803b auxiliary devices carrying soldier in the first group
801N multicopter drone carrying soldier in the Nth group
802N missile carrying soldier in the Nth group
803N auxiliary devices carrying soldier in the Nth group
811 Enemy's end of line of sight
831 Enemy's first tank
832 Enemy's second tank
833 Enemy's third tank
834 Enemy's ground troops
835 Enemy's trucks carrying logistics and/or troops

What is claimed is:

1. A method for detecting and destroying enemies' targets, comprising:
    (a) carrying a drone in a backpack of a first soldier, wherein said drone is rigid and further comprises a hub connected to an elongated rigid main body which is coupled to a plurality of rigid flight arms and a plurality of stands;
    (b) removing said drone from said backpack, unfolding, and coupling a weaponry to said drone; wherein said unfolding step further comprises unfolding said elongate rigid main body outward from two different sides of said hub;
    unfolding said plurality of rigid flight arms outward from said elongate rigid main body;
    unfolding said plurality of stands outward from said plurality of rigid flight arms respectively;
    unfolding said propellers from said plurality of rigid flight arms; and
    (c) controlling said drone to search for said enemies' targets using a remote control.

2. The method of claim 1 further comprising:
    (d) activating said weaponry from said drone to destroy said enemies' targets when said enemies' targets are detected.

3. The method of claim 2 wherein said step (d) further comprises detecting said enemies' targets using an RGB video and thermal video signals transmitted from said drone to said remote control which includes a display unit.

4. The method of claim 2 wherein said step (d) further comprises detecting said enemies' targets using Geographic Positioning Satellite (GPS) coordinates obtained by said drone and transmitted back to said remote control.

5. The method of claim 2 wherein said step (d) further comprises triggering said weaponry to launch toward said enemies' targets is from said remote control.

6. The method of claim 1 further comprising (e) carrying said weaponry by a second soldier.

7. The method of claim 1 wherein said enemies' targets comprise a tank.

8. The method of claim 1 wherein said enemies' targets further comprise military vehicles.

9. The method of claim 1 wherein said enemies' targets further comprise military troops.

10. The method of claim 1 wherein said enemies' targets further comprise military facilities.

11. The method of claim 1 wherein said weaponry weighs at least 12 kg.

12. The method of claim 1 wherein said weaponry is a missile.

13. The method of claim 12 wherein said missile is a Javelin anti-tank missile.

14. The method of claim 1 wherein said drone is configured to having a folded (stowed) state and a fully extended (operational) state, wherein said drone further comprises:
    said hub comprising controller circuitry for communicating with said remote control, a battery, and at least one payload coupler for coupling said missile into said drone;
    said elongate rigid main body; coupled to said hub; configured to be folded substantially close to said hub at two different joints located adjacent to two opposite sides of said hub in said folded state; and extended outward therefrom in said operational state;
    said plurality of rigid flight arms; coupled to said elongated rigid main body; configured to be folded substantially close into said rigid main body in said folded state; and extended outward therefrom in said operational state; and
    said plurality of stands, each connected respectively at a distal end of each of said plurality of rigid flight arms, configured to be folded substantially close into each of said plurality of rigid flight arms in said folded state and extended outward therefrom; whereby (a) the waste empty spaces between said hub, said elongate rigid main body, said plurality of rigid flight arms, and said plurality of stands is substantially zero, (b) a dimension of said drone in said folded state is less than 10% of that of said operational state so as to be carried in said backpack of said soldier.

15. The method of claim 1 further comprising carrying auxiliary logistics necessary to operate and maintenance said drone by a third soldier.

16. The method of claim 2 said step (d) further comprises: capturing and transmitting video images and GPS coordinates of said enemy's targets to said first soldier; and flying at a low altitude to avoid a detection of enemy's radars.

17. The method of claim 14 wherein said step (b) of removing said drone from said backpack, unfolding, and coupling a weaponry to said drone further comprises:
    unfolding said propellers from said plurality of flight arms
    unfolding a pair of legs from said plurality of stands whereby in said operational state said elongate rigid main body is perpendicular to said hub, said plurality of rigid flight arms is perpendicular to said rigid main body, and said plurality of stands is perpendicular to said rigid main body and said plurality of rigid flight arms.

18. The method of claim 1 wherein said step of coupling said missile to said drone further comprises using a gimbal coupler.

19. The method of claim 1 wherein said gimbal coupler couples to a center of gravity of said missile.

20. The method of claim 1 wherein said first soldier, said second soldier, and said third soldier deploy said drone at a predetermined distance away from being detected and harmed by enemies.

* * * * *